(12) United States Patent
Hugdahl

(10) Patent No.: US 6,651,964 B2
(45) Date of Patent: Nov. 25, 2003

(54) ADJUSTING ARRANGEMENT FORMING PART OF A SHOCK ABSORBER

(75) Inventor: Mats Hugdahl, Knivsta (SE)

(73) Assignee: Öhlins Racing AB, Upplands Vasby (SE)

( * ) Notice: Subject to any disclaimer, the term of this patent is extended or adjusted under 35 U.S.C. 154(b) by 0 days.

(21) Appl. No.: 10/114,061

(22) Filed: Apr. 3, 2002

(65) Prior Publication Data

US 2002/0139623 A1 Oct. 3, 2002

(30) Foreign Application Priority Data

Apr. 3, 2001 (SE) .............................. 0101178

(51) Int. Cl.[7] ................................. F16F 9/34
(52) U.S. Cl. ................. 267/64.22; 188/322.14
(58) Field of Search ................. 188/315, 322.14, 188/319.1; 280/275, 276; 267/64.18, 64.22

(56) References Cited

U.S. PATENT DOCUMENTS 5,542,509 A * 8/1996 Bell ...................... 188/322.14
6,360,857 B1 * 3/2002 Fox et al. ................ 188/281

* cited by examiner

Primary Examiner—Christopher P. Schwartz
(74) Attorney, Agent, or Firm—Connolly Bove Lodge & Hutz, LLP; Larry J. Hume

(57) ABSTRACT

An arrangement forms part of a shock absorber (1) and is intended to produce distinct longitudinal displacements of an element (7) in response to longitudinal displacements of a screw (15). The displacement directions of the screw and the element diverge and the displacement of the element is designed to occur against the action of a force (14) on the element. The screw is designed with a tapered or inclined surface (17) and the element, or a part related thereto, is pressed against the surface by the said force (14). Interacting sections of the surface and the element, or the part, are designed with structures that produce the said distinct longitudinal displacement positions of the element when acted upon by the member. In this way the element actuation function and that of producing the distinct positions can be incorporated into a relatively simple and compact construction.

17 Claims, 5 Drawing Sheets

ADJUSTING ARRANGEMENT FORMING PART OF A SHOCK ABSORBER

Figure 1:
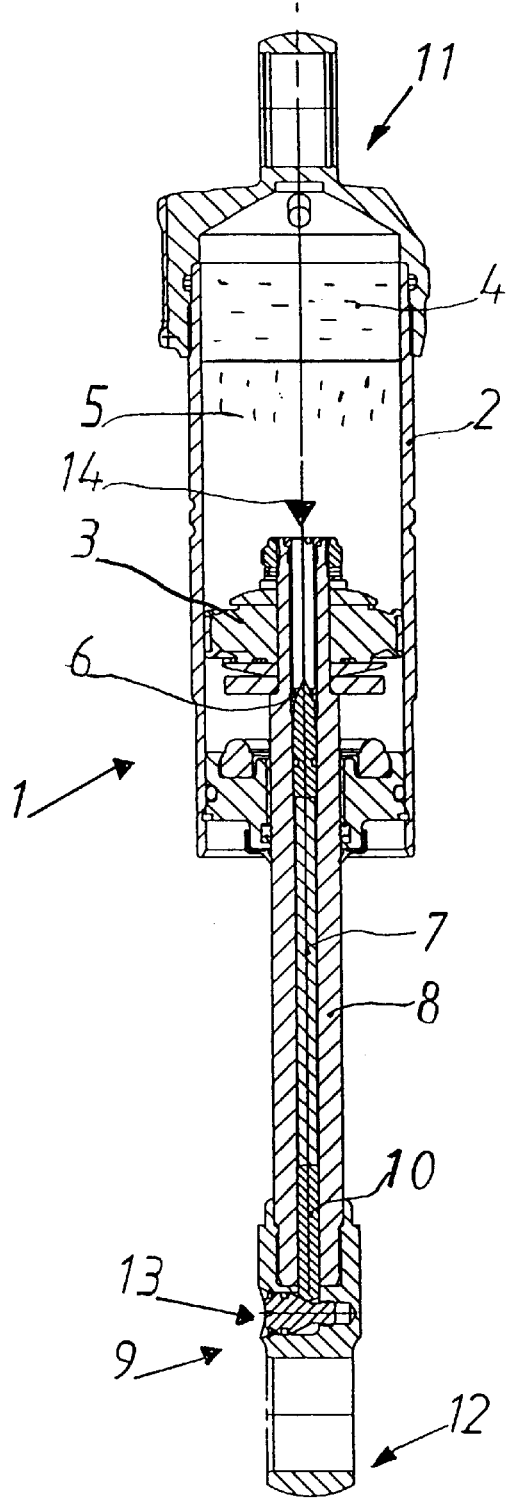

The present invention relates to an arrangement forming part of a shock absorber and intended to produce distinct longitudinal displacement positions of an element as a function of longitudinal displacements of a member, such as a screw, for example. In this, the displacement directions of the member and/or the screw diverge and may differ by 45–90°, for example. Displacement of the element is furthermore designed to occur against the action of a force on the element.

Producing displacements of such an element by means of the action of a member is already known in shock absorbers. Thus the facility for manual, external adjustment of the shock absorber bleed by means of a member, the actuation of which displaces the element thereby acting on the restrictor, is known in shock absorbers. Reference might be made here to the Öhlins brand shock absorber, type 46 PRC, available on the general market. There is a desire in this context to be able to obtain distinct positions and possibly clicking noise effects at the transitions between the various actuation or adjustment positions. In order to achieve this it has hitherto been proposed to distinguish the element actuating function itself from the function of producing distinct positions and possibly clicking noise effects.

In the case of shock absorbers there is often a problem of reconciling the demand for space with that of functionality. For example, there is the problem of being able to perform adjustment functions on shock absorbers externally, given the pressing need to enclose or build the shock absorber into the chassis. Thus, for example, there may be problems in implementing a desired adjustment function for the restrictor or bleed in spaces where there are difficulties in applying or arranging actuators for the adjustment. The need for a compact and efficiently functioning but nevertheless relatively simple construction is paramount. The invention is intended to solve this and other problems.

When externally adjusting the bleed, for example, there is a need to be able to carry out adjustments in the form of distinct adjustment positions, which at least in certain cases must also be additionally capable of producing noise effects (so-called clicking noises) at the transition between the various positions. The distinct positions must also be precise and be capable of meeting existing accuracy requirements for the adjustment. The arrangement must also be such that it can be adapted to different methods of incorporating the shock absorber into the chassis without neglecting the accuracy requirement. There is a need to make the adjusting arrangement technically simple with only a few parts, and moreover non-critical. If turning tools/screwdrivers are used, the access must be clear and distinct. It must be possible to make the element and/or its associated parts of aluminum, steel, magnesium or alloy and it must not be subject to undue mechanical wear by the actuating arrangement. In one embodiment the arrangement must be compact in its diameter and cross-sectional dimensions. In addition, there must be sealing to prevent the ingress of water and dirt. Thus, for example, the arrangement must prevent water and cleaning agents getting in during high-pressure washing. The invention is also intended to solve these problems.

The arrangement according to the invention is essentially characterized in that the member or the screw is designed with a tapered or inclined surface, that the element or a part related thereto is pressed against the surface by the said force and that interacting sections of the surface and the element, or of the part, are designed with structures that produce the said distinct longitudinal displacement positions of the element when acted upon by the member.

In a preferred embodiment, the member and the element are arranged in connection with an end attachment on the shock absorber. The element or the part can thereby extend into the attachment and be arranged so that it can be acted upon by the member or the screw for manual, external adjustment of a restrictor (bleed) through actuation, such as turning, by means of a tool/knob/screwdriver, via a recess in the end attachment. In the said preferred embodiments the member or the screw comprises a front threaded part, the thread of which interacts with a corresponding thread in or inside the end attachment. In addition, the member or the screw has a second part of conical design with a structure comprising depressions extending side by side and in the main longitudinal direction of the surface, and ridges arranged between these. In one embodiment the depressions have an essentially curved cross-section and may extend along the main parts of the longitudinal extent of the conical or inclined surface. The member or the screw preferably also has a third part designed to carry a seal, such as an O-ring, that provides sealing against the wall in the recess of the end-piece. The member or the screw may also have a fourth part in the form of an end part, via which the member or the screw can be actuated by means of a tool, such as a turning tool or integral knob.

The end attachment may be arranged with a high degree of enclosure, in view of the fact that access to the member, the element or the part can be effected via a lateral recess in the end attachment. The recess may be freely selected in respect of its orientation and location around the circumference of the end attachment. At its end capable of interacting with the structure of the member, the element or the part is designed with a structure in the form of a sphere or spherical shell, the shape of which is matched to the structure of the surface in order to minimize the surface pressure, thereby reducing wear. Where the member is moved to each distinct position by a turning action, the conical or inclined surface is displaceable in relation to the end of the element or the part, whilst the element is arranged so that it can be pressed upwards or outwards against the action of the force referred to in the introductory part by means of the ridge between the depression, which releases the element to the succeeding depression that the element must occupy owing to the turning action. The ridges are formed so that they narrow towards that section of the conical or inclined surface having the smaller diameter, that is to say the depressions are designed with essentially the same width over their entire extent on the conical or inclined surface.

The above-mentioned proposals provide a number of advantages. The arrangement is unambiguous from the point of view of actuation, whilst the various functions can be incorporated into a single part, which can easily be designed to reproduce the precise requirements for adjustment and distinctiveness. The arrangement also provides a simple way of excluding any dirt particles, which are prevented from getting into the recess in the end attachment and adversely affecting the actuation functions for the restrictor or bleed in question. The invention can also be used in connection with other types of adjustments, in which a displaceable element is required having distinct displacement positions and stipulated accuracy requirements. The ability to select the location of the recess around the circumference of the end attachment is also a great advantage where the function is to be incorporated into different types of shock absorber installations in the chassis. The arrangement also provides an excellent overview of the tool application. The member can be manufactured from steel or other suitable material. The said part can be made of correspondingly durable material while the actuating rod itself, due to functional reasons of the bleed, can be manufactured from aluminum or other corresponding material. The conical or inclined surface may be formed in some other way, for example by means of inclined parts or fins that are held together by rings, welds etc. at their ends, the said parts or fins being formed with curved or gently sweeping surfaces in their sections capable of interacting with the element.

Figure 2:
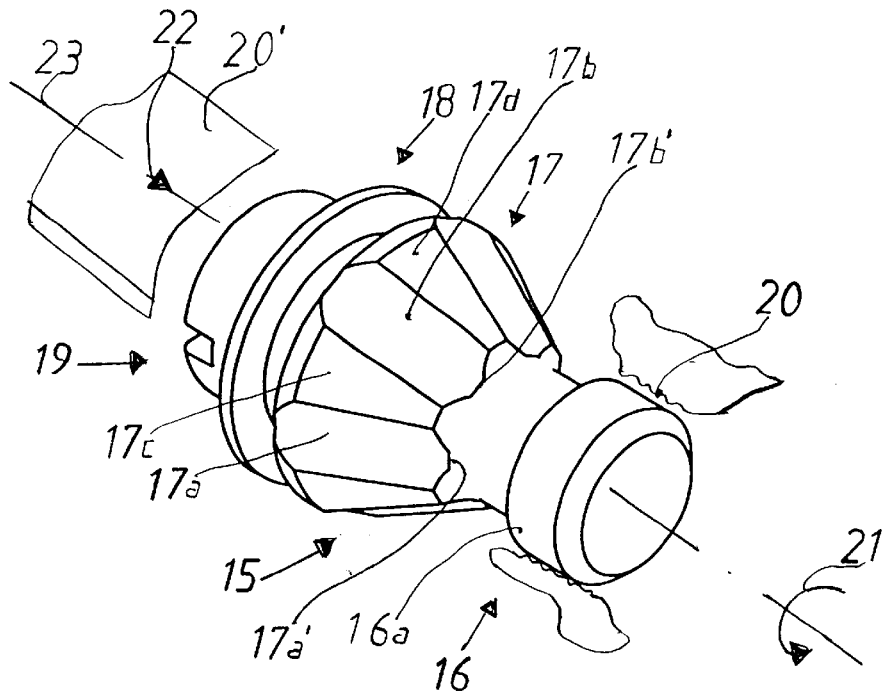
Figures 3, 4:
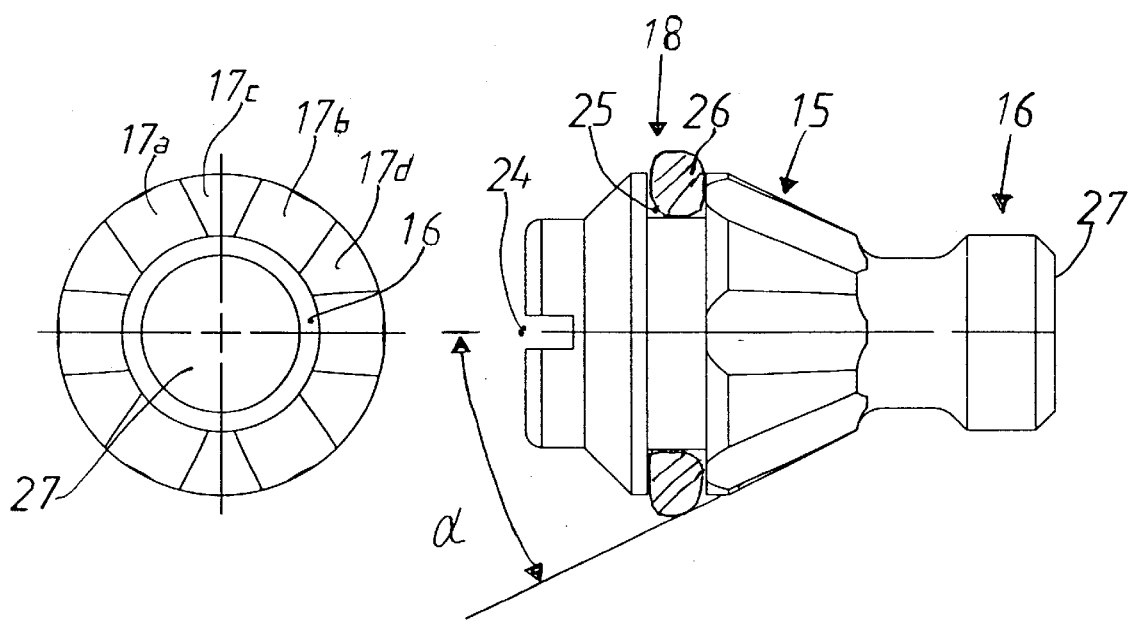
Figure 5:
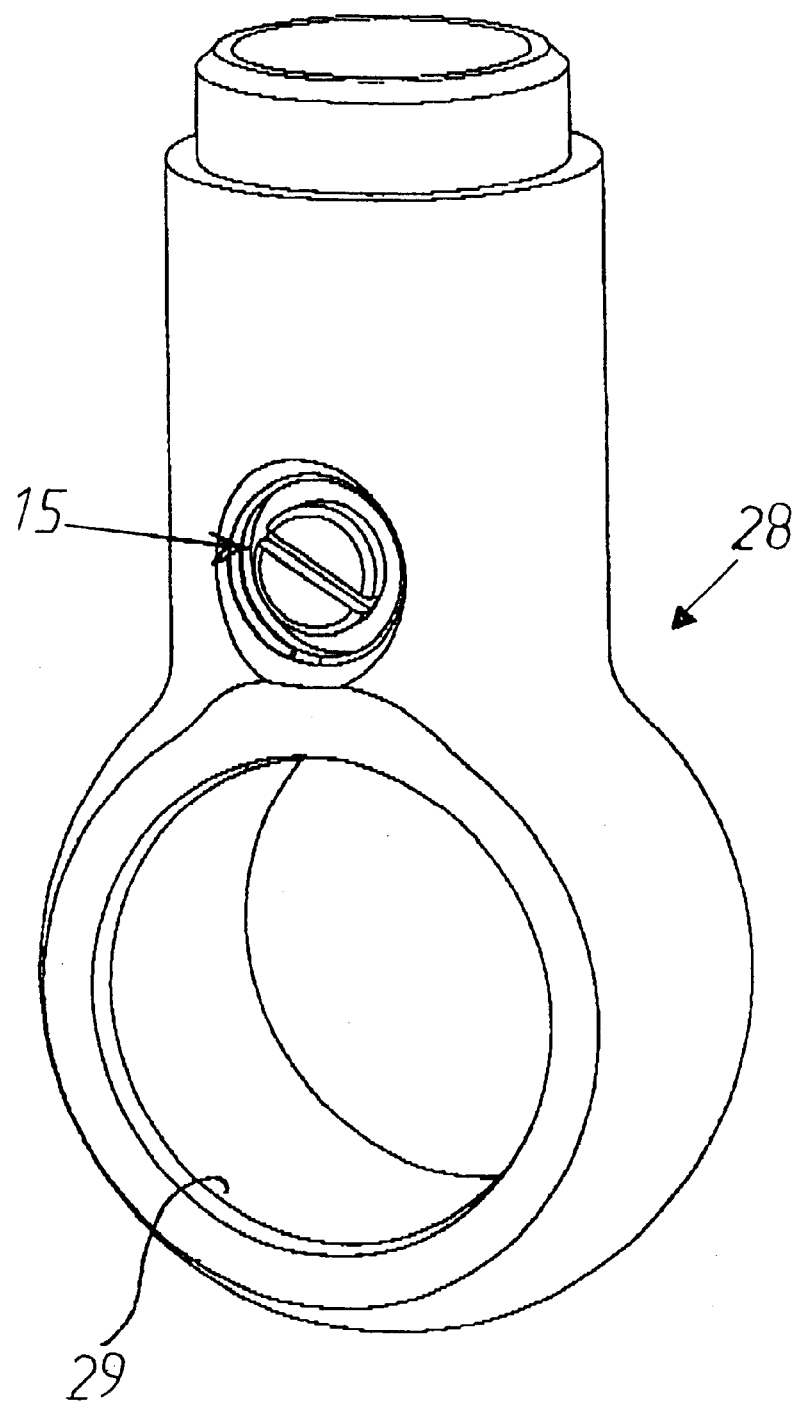
Figure 6:
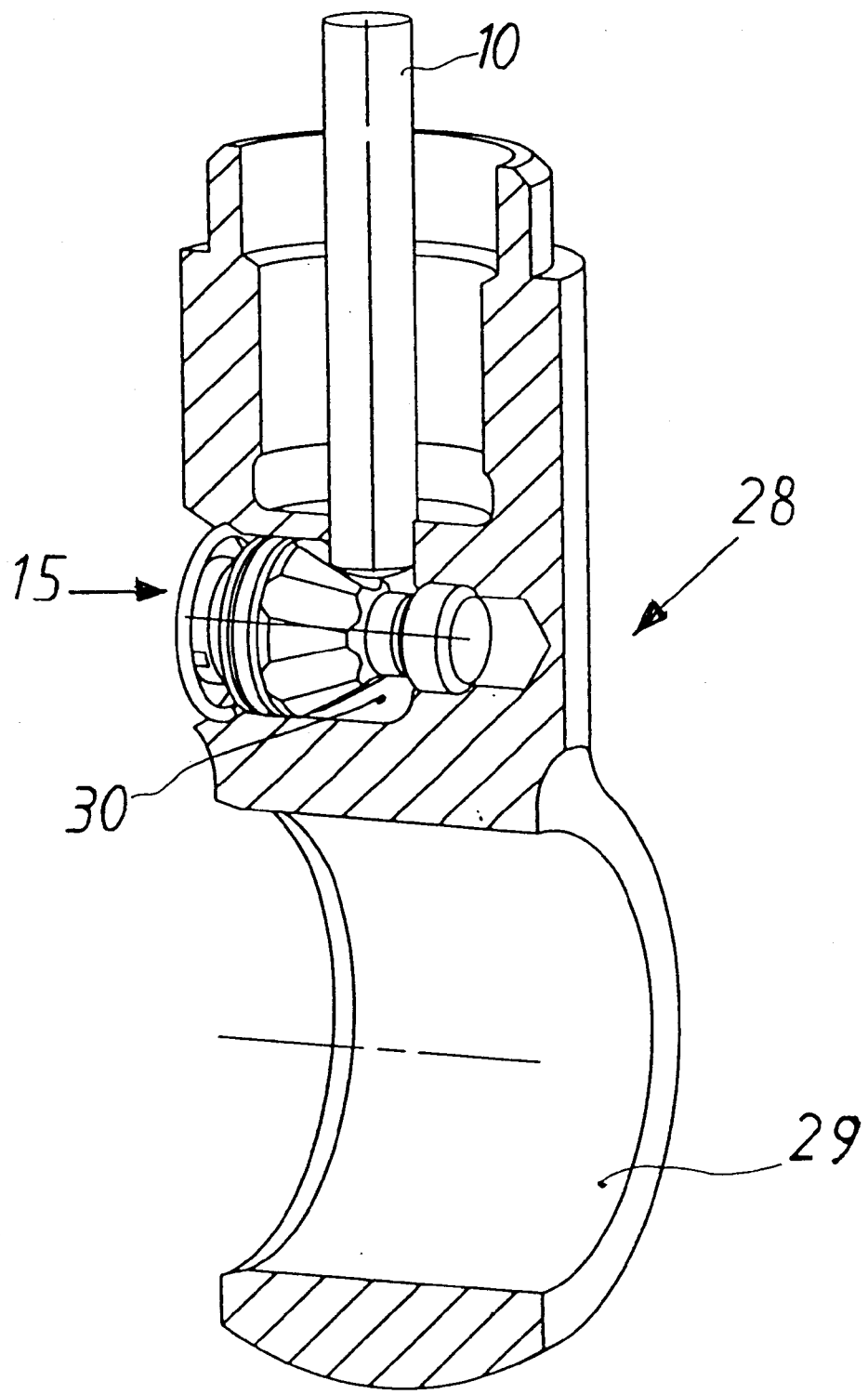
Figure 8:
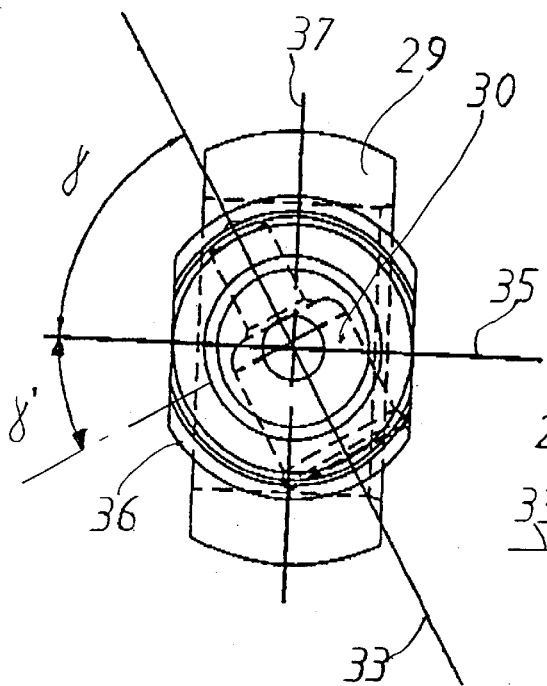
Figure 7:
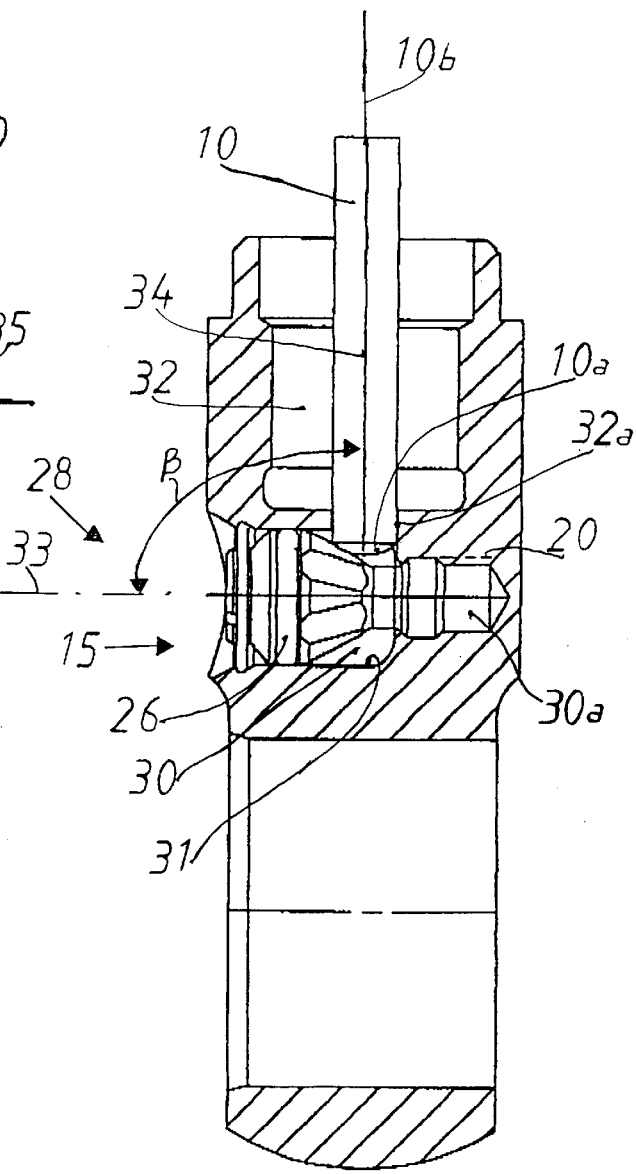

A currently proposed embodiment of an arrangement having the significant characteristics of the invention will be described below with reference to drawings attached, in which FIG. 1 shows a longitudinal section through a shock absorber construction of a type known in the art, which has been provided with the new adjusting arrangement, FIG. 2 shows an oblique perspective view of the member or the screw from below, FIG. 3 shows a longitudinal view of the member or the screw according to FIG. 2, FIG. 4 shows an end view of the member or the screw according to FIG. 2, FIG. 5 shows an oblique perspective view from above of an end attachment of the shock absorber shown in FIG. 1, in which end attachment the member or the screw according to FIGS. 2, 3 and 4 is applied, FIG. 6 shows a perspective view of a vertical section through the end attachment according to FIG. 5, FIG. 7 shows a vertical section through the attachment according to FIG. 5, and FIG. 8 shows an end view of the attachment according to FIG. 5.

In FIG. 1, 1 denotes a shock absorber of the Öhlins 46 ER type. Since the shock absorber is already well known on the general market and in the literature, it will not be described in detail but only with regard to those parts of the shock absorber tat have been modified in respect of the new adjusting arrangement. The shock absorber comprises, among other things, a cylinder 2 and a piston arrangement 3 arranged in the cylinder. In addition, there is a space containing nitrogen gas 4, which in a known manner pressurizes the oil 5 (medium) in a space in front of the piston 3 intended for this purpose. A bleed function 6, known in the art, is arranged in the piston arrangement. The bleed function can be adjusted from outside the shock absorber by means of a push rod 7, which extends inside a piston rod 8. The shock absorber also comprises a main spring (not shown) and an end attachment 9. The push rod 7 is made of, aluminum, magnesium etc., in order to obtain a predetermined linear expansion function (coefficient of linear expansion) in the event of temperature variation in the bleed function. The rod extends down into the end attachment 9. At its end situated in the end attachment 9, the rod can interact either directly or via a rod part 10 wit the adjusting member described below. The shock absorber is also provided with a fixing function 11 in the chassis and a fixing function 12 in the vehicle wheel, the runner etc. The adjusting member is principally denoted by 13. The arrangement is also characterized in that the (excess) pressure in the cylinder space 5 generates a force 14 (resultant force), which acts on the rod 7 at its upper end and presses the rod or any intermediate rod part 10 against the adjusting member as described below.

FIG. 2 shows a member or a screw 15 forming part of the adjusting arrangement. The member or the screw comprises a front part 16, a second part 17, a third part 18 and a fourth part 19. The part 16 is provided with an external thread 16a, by means of which the screw can be screwed into a corresponding thread 20 in the end attachment as described below. The second part comprises a conical or inclined surface, which is designed with a first structure. In one exemplary embodiment this surface structure may comprise or contain depressions 17a, 17b arranged side by side. In their cross-section in the longitudinal direction of the surface, the said depressions are provided with essentially curved or gently sweeping surfaces 17a', 17b'. Ridges 17c, 17d exist or are arranged between the depressions. The depressions are essentially of equal width over their entire longitudinal extent, whilst the ridges narrow from the larger base of the conical surface towards the smaller base of the conical surface. Other designs of the ridges and the depressions are possible. The third part 18 is designed with a groove for a seal, which may take the form of an O-ring seal. The fourth part 19 is intended to be capable of interacting with an actuating tool, such as a turning tool 20', for example, by means of which the user can impart turning movements to the member or the screw 15 both in an anticlockwise and in a clockwise direction. In FIG. 2, the clockwise direction has been denoted by 21. Under the said turning action, the member or the screw is moved outwards or inwards in the thread 20, so that longitudinal displacement of the member or the screw occurs in the longitudinal direction thereof. In FIG. 2 a displacement movement in the one direction has been denoted by 22.

According to the invention, the rod 7 (see FIG. 1), or in the exemplary embodiment the part 10 (see FIG. 1) is pressed against the conical or inclined surface 17 of the member or the screw 15. The said pressing action, as described above, occurs with the aid of the force 14 (see FIG. 1). At the functional stage shown in FIG. 2, the end surface of the part 10 comes against the surface in one of the said depressions. The end surface of the part 10 has a structure that matches the surface shape of each depression. If a clockwise movement is imparted to the member or the screw according to the arrow 21, the surface shape of the depression will apply an upwardly directed action or actuating force that is opposed to the force 14 on the part 10. If the turning movement is maintained, the part will mount one of the said ridges, that is to say the part 10 has been moved to its maximum raised position against the action of the force 14. If the turning movement is further maintained in the direction 21, the succeeding depression in the direction of the turning movement will be applied against the end surface of the part 10, which means that the part 10 is brought into the succeeding depression by means of the resultant force 14. In this way a self-locating position or a distinct new position is obtained. In one embodiment the said function can be designed so that a certain clicking noise is obtained, which indicates the new position. If turning movements are continued in an anticlockwise or clockwise direction, the interaction of the part 10 passes between the various depressions in the conical or inclined surface. When the member or the screw is screwed in or out, the said longitudinal displacements of the member or the screw cause the element/ the rod, or the part 10, to assume different longitudinal positions, which means that the bleed as described above is acted upon as a function of the longitudinal displacement position of the member or the screw along its longitudinal axis 23. Longitudinal displacements of the element/the rod 7 and possibly the part 10 are therefore performed in stages or adjustments that are distinct or self-locating. The force 14 is thereby of an order of magnitude that will facilitate the generation of any said clicking noise effect. The angle of taper of the part 17 in combination with the pitch of the thread 16*a* and the constant angle between the depressions determine the displacement of the bleed needle (7, 10) for each distinct position adopted by or assigned to the adjusting screw 15.

FIG. 3 shows tat the member or the screw is designed with a groove 24 for interaction with the turning member 20' (see FIG. 2). The groove 24 may take the form of a screwdriver slot. Alternatively another turning tool or key may be used, so that a square or hexagonal recess may be used, for example. The third part 18 is provided with a recess 25 for the sealing ring, which in FIG. 3 is denoted by 26. The half-taper angle of the conical surface according to the above is denoted by $\alpha$ and may assume values of between 15 and 45°, for example, values in the range 20–30° being preferable.

FIG. 4 shows the depressions 17*a*, 17*b* and the ridges 17*c*, 17*d* from the end of the screw 15 with the part 16, the end surface of which is denoted by 27.

In FIGS. 5 and 6 an exemplary embodiment of the end attachment is denoted by 28 with screw 15 applied. The end attachment in this case is an eye 29. The recess for the member or the screw 15 as described above is denoted by 30 in FIG. 5. The placing of the end attachment and its application to the shock absorber are well known in the art and will therefore not be described in more detail here.

The above-mentioned internal thread 20 can be seen from FIG. 7. The thread 20 is arranged in a part 30*a* of the recess 30. The recess 30 is provided with a front sealing surface 31, against which the member or the screw 15 is sealed off by the seal 26 described above, which is consequently pressed against the tool part 31 in question. The said seal means that foreign particles, dirt, oil etc cannot get into the interior of the end attachment 28 from outside. The end attachment is also provided with a recess 32 for the rod or the part 10, the longitudinal axis of which has been denoted by 10*b*. The surface structure 10*a* may interact, by way of the inner section 32*a* of the recess 32, with the said member or screw 15, as described above. The longitudinal axis of the recess 30 has been denoted by 33. In a preferred exemplary embodiment the angle $\beta$ between the longitudinal axis 34 of the recess 32 and the longitudinal axis 33 is approximately 90°. The angle $\beta$ may be designed with other angles, however, and assume other values of between 45 and 135°, for example.

In FIG. 8, the recess 30 is shown with an angle $\gamma$ of approximately 60°. In the figure, 35 denotes a centerline of the eye 29, and the latter aforementioned angle relates to the angle between the axes 33 and 35. The latter aforementioned angle may also assume various values within an angular range of 120°, for example. Great design freedom therefore exists when arranging the recess 30 around the circumference 36 of the end attachment. In the figure a second angle $\gamma''$—has also been shown, and the recess 30 may open out, for example, within the angular range formed by the two angles on both sides of the axis 37, which in FIG. 7 is perpendicular to the axis 35.

The end attachment also has threads in the recess 32 for screw fastening of the end attachment in the shock absorber in a manner known in the art. The end part 10*a* may preferably be designed in the form of a sphere or spherical shell. The rod or the part 10 is guided in its lower parts in the recess part 32*a*.

The invention is not confined to the embodiments shown by way of example above but lends itself to modifications within the scope of the following claims and the idea of the invention.

What is claimed is:

1. An arrangement forming part of a shock absorber, the arrangement comprising:
   a longitudinal element;
   an adjusting member having a tapered surface arranged to be in contact with an end portion of the longitudinal element so as to produce distinct longitudinal displacement positions of the longitudinal element along a direction of a force acting on the longitudinal element when the adjusting member is adjusted,
   wherein interacting sections of the tapered surface and the longitudinal element include operating structures that produce the distinct longitudinal displacement positions of the longitudinal element when acted upon by the adjusting member.

2. The arrangement of claim 1, wherein the tapered surface of the adjusting member comprises a generally conical shape having a plurality of alternating depressions and ridges extending side by side along a longitudinal direction of the tapered surface.

3. The arrangement of claim 2, wherein the plurality of alternating depressions each have an essentially curved or angular cross-section.

4. The arrangement of claim 1, further comprising an end attachment which receives the adjusting member and the longitudinal element,
   said end attachment having a lateral recess arranged therein to provide access to an adjusting portion of the adjusting member suitable for actuation by an external turning tool when the arrangement is externally adjusted.

5. The arrangement of claim 4, wherein the end attachment is enclosed except for the lateral recess which provides essentially free access to the adjusting element either by a position of the lateral access wit respect to a circumference of the end attachment, or an angle of inclination of the lateral access with respect to a longitudinal axis of to end attachment, or both.

6. The arrangement of claim 1, wherein said adjusting member comprises a threaded screw.

7. The arrangement of claim 1, wherein a displacement direction of the adjusting member diverges from the direction of the force acting on the longitudinal element by an angle in a range of 45°–90°.

8. The arrangement of claim 1, wherein the end attachment comprises an internally threaded portion which interacts wit external threads of the adjusting member.

9. The arrangement of claim 1, wherein the adjusting member comprises a groove containing a sealing member which seals against a wall of the end attachment.

10. The arrangement of claim 1, wherein to interacting sections of the tapered surface each have a cooperating shape tat is matched to a shape of an end portion of the longitudinal element,
    wherein the cooperating shape in conjunction wit the shape of the end portion of the longitudinal element provides the distinct longitudinal displacement positions of the longitudinal element.

11. The arrangement of claim 1, wherein, when the adjusting member is moved to one of the distinct longitudinal displacement positions of the longitudinal element by a turning action, the tapered surface is displaced in relation to the end portion of to longitudinal element,
    wherein a ridge on the tapered surface of the adjusting member is pressed against the longitudinal element to counter the force acting on the longitudinal element.

12. The arrangement of claim 1, wherein the tapered surface of the adjusting member comprises alternating ridges and depressions thereon,
 wherein the ridges are shaped to have a progressively narrower width toward a first end of the tapered surface which has progressively relatively smaller diameters than diameters of the tapered surface in a direction toward a second end distal to the first end of the tapered surface,
 wherein each depression has essentially a same width over an entire extent of the tapered surface.

13. The arrangement of claim 1, wherein the longitudinal element comprises a push rod.

14. The arrangement of claim 1, wherein the adjusting member comprises an integral knob for adjusting the distinct longitudinal displacement positions of the longitudinal element.

15. The arrangement of claim 1, wherein the adjusting member comprises a screwdriver slot.

16. The arrangement of claim 1, wherein the adjusting member comprises a square slot.

17. The arrangement of claim 1, wherein the adjusting member comprises a hexagonal slot.

* * * * *